March 13, 1956 R. HERR ET AL 2,738,383

METHOD AND APPARATUS FOR DUPLICATING MAGNETIC RECORDINGS AND MAGNETIC TAPE RECORD MEMBERS

Filed June 21, 1948 3 Sheets-Sheet 1

Inventors
Robert Herr
Reynolds Marchant
By Carpenter, Abbott, Coulter & Kinney
Attorneys Inventors
Robert Herr
Reynolds Marchant
By Carpenter, Abbott, Coulter & Kinney
Attorneys March 13, 1956 R. HERR ET AL 2,738,383

METHOD AND APPARATUS FOR DUPLICATING MAGNETIC RECORDINGS AND MAGNETIC TAPE RECORD MEMBERS

Filed June 21, 1948 3 Sheets-Sheet 3

Inventors
Robert Herr
Reynolds Marchant
By Carpenter, Abbott, Coulter & Kinney
Attorneys United States Patent Office 2,738,383
Patented Mar. 13, 1956

2,738,383

METHOD AND APPARATUS FOR DUPLICATING MAGNETIC RECORDINGS AND MAGNETIC TAPE RECORD MEMBERS

Robert Herr and Reynolds Marchant, St. Paul, Minn., assignors to Minnesota Mining & Manufacturing Company, St. Paul, Minn., a corporation of Delaware Application June 21, 1948, Serial No. 34,328

28 Claims. (Cl. 179—100.2)

This invention relates to methods and apparatus for making copies on unrecorded magnetic record members of sound previously magnetically recorded on a tape record member. The master tape recording member is provided with a sound recording applied in a conventional magnetic recording device by magnetizing successive portions of the moving record member in accordance with the fluctuating audio frequency signals. The terms "magnetic recording tape" and "magnetic record member," as employed in this application, include strips, discs, cylinders or sheets provided with a magnetizable element, and also moving picture films having as a part thereof a magnetic record member. It is to be understood that the invention contemplates the use of all of the above types of record members as the member from which, or upon which, the duplicate record is made.

The magnetic recording art has long needed a satisfactory method of making a multiplicity of duplicate recordings from a master record. Heretofore this has been accomplished by playing the master recording through a conventional reproducing head and by rerecording the sound pattern thus obtained on other unrecorded magnetic record members by means of amplifiers and a conventional recording head. This method has the following disadvantages: (1) It requires a large amount of electronic equipment; (2) the copy of the master record must be made at essentially the same speed at which the master was made, i. e. recording speeds of five to thirty inches per second; (3) the distortion effects inherent in the original recording become cumulative in the transfer of magnetic energy to electrical energy and back to magnetic energy. The prime object of the present invention, therefore, is the development of a method of making multiple magnetic reproductions from a master recording in which the above disadvantages are eliminated. A further object is the development of a method of making multiple magnetic reproductions of a master recording in which the magnetic energy, or residual induction, of the master record is reproduced on a multiplicity of unrecorded magnetic members without the intermediate conversion of the magnetic energy to and from electrical energy, and without the use of conventional recording or reproducing heads.

We have found that very satisfactory duplicates of magnetic sound recordings and the foregoing highly desirable results may be obtained by placing the master record to be duplicated and the unrecorded record member with their magnetically active surfaces in contact, and subjecting the two record members to a controlled idealizing action such as magnetic mechanical or thermal strains. The method includes the use, as a master record, of a magnetic record member capable of reproducing a high signal output, and as a duplicate record member, a magnetic member requiring a lower value of magnetic field for conventional magnetic recording and one that saturates at a relatively low field. Thus the master record member should have a higher coercive force and remanence value than the member on which the duplicate recording is made.

Among the features of the improved method and apparatus for reproducing magnetic copies are the following: (1) The speed of the duplicating machine is not critical. (2) Suitable duplicating apparatus is readily produced and is easy to construct and maintain; its adjustments are not critical. Maintenance is primarily mechanical rather than electrical. (3) Any distortion in the master recording is not compounded in the duplicates. (4) An unlimited number of duplicates may be made from a single master record member without material deterioration of the master record.

A further feature of the improved method and apparatus is that the recorded duplicate record member substantially reproduces all audio frequencies recorded on the master member and has a satisfactory signal output, in that the absolute value of the maximum output voltage of the duplicate member is fully adapted for use in conventional devices for reproducing sound from a magnetic track.

The invention, in respect to suitable apparatus for duplicating magnetic recording and the method of making duplicate recordings, may be readily understood from the following description, in connection with the accompanying drawings, in which.

Figures 3, 4, 7:
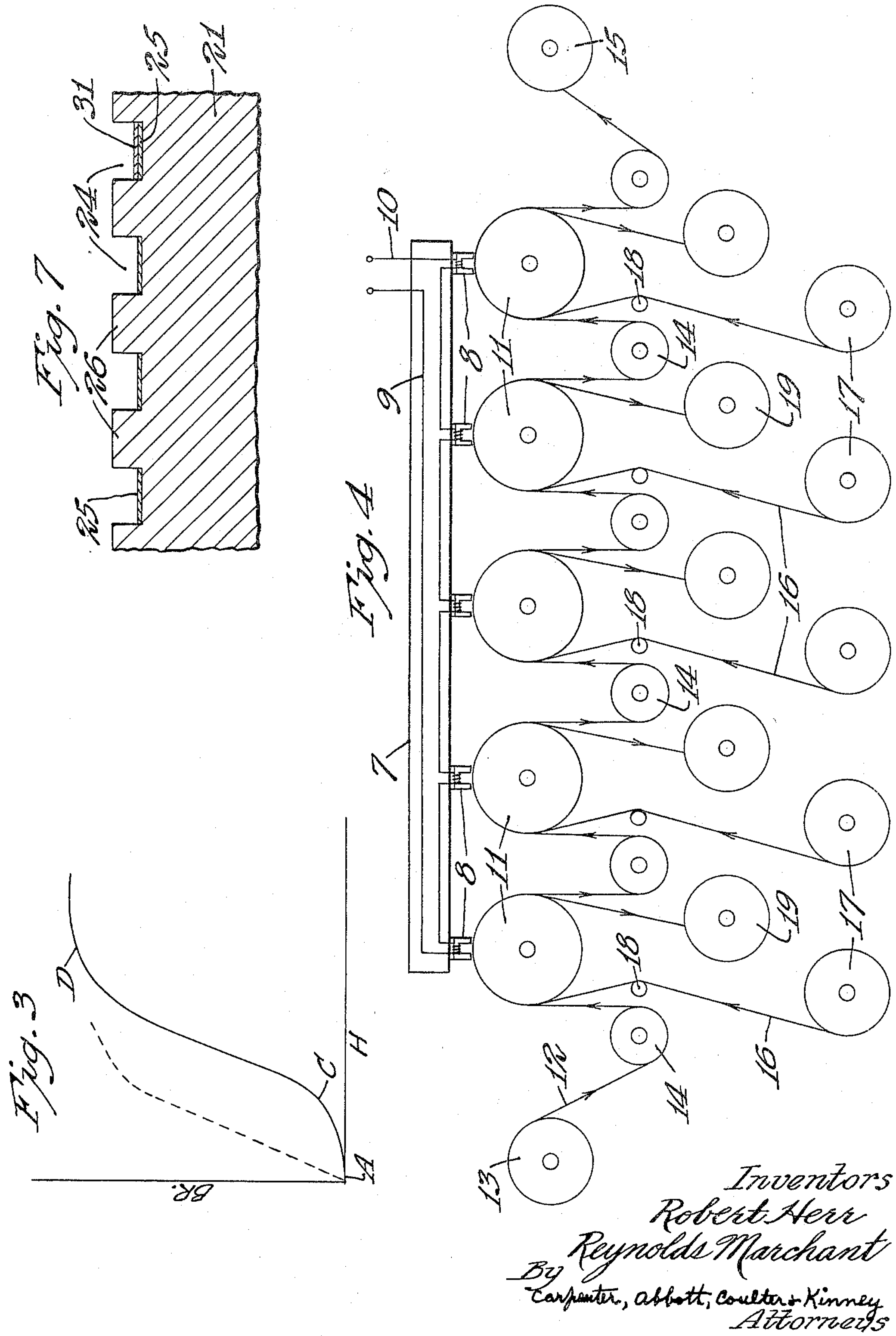
Fig. 3 shows residual induction curves of an unrecorded magnetic record member.
Fig. 4 is a diagrammatic illustration of another form of duplicating apparatus.
Fig. 7 is an enlarged fragmentary view of a peripheral section of the drum shown in Figs. 5 and 6.

Referring to Fig. 3, the curve shown in the full line is the characteristic initial magnetization curve of conventional record members obtained by plotting residual magnetic induction Br in gauss remaining in the previously unrecorded record member after it has been subjected temporarily to the influence of a magnetic field H of the values in oersteds indicated. It is apparent that the slope of the curve is initially very small and that after reaching the point C, it rises with a steeper, substantially linear slope until it reaches the point D. Thus when a recorded magnetic record member is placed in contact with a previously unrecorded magnetic record member the field of the recorded member magnetizes the unrecorded member to a slight degree. The fields present in the vicinity of a recorded record member are small and the amount of residual induction in the previously unrecorded member is very small and is not proportional to the magnetization of the originally recorded member. Thus the amount of residual induction in the unrecorded member after having been placed in contact with a recorded member would be in the portion A—C of the curve.

We have found however that if there is superimposed on the previously unrecorded member, while it is in the field H of the recorded member, an agitation of the unrecorded member, the residual induction of this member will follow the broken line in Fig. 3. This line is characterized by much larger residual induction and essential linearity for small values of H than is the full line of Fig. 3. This agitation may take the form of any disturbance capable of introducing strains in the crystal lattices of the previously unrecorded magnetic record member, for example, such as thermal strains, mechanical vibrations, magnetic fields, X-radiation, electrostatic fields or spark discharges. Such forms of agitation are termed idealizing fields. An alternating magnetic field may conveniently be used. If this field is used, a preferred arrangement is an alternating field which, for a few cycles, carries the magnetic medium essentially to saturation in both directions and then gradually decreases over the course of many cycles to a negligibly small field. In idealization by a magnetic field the gradual reduction over the course of many cycles is necessary in order that the idealizing frequency not be recorded on the magnetic medium. In the event that the idealizing frequency is sufficiently high that its recording is not objectionable, the condition of gradual decrease may be relaxed to allow the field to reduce essentially to zero in the course of only a few cycles. We have found that very satisfactory duplicates of magnetic recordings may be obtained by placing the master record and the unrecorded magnetic record member with their magnetically active surfaces in contact and subjecting the unrecorded member to a controlled idealizing action of this type.

We have further found that in making duplicate recordings in the presence of an idealizing field, an essentially undistorted sine wave recorded on the master record member may be duplicated on another member with no measurable increase in distortion and that the level of the duplicate recording may be made suitably high for reproduction by conventional magnetic reproducing heads. Duplicating recordings by contacting the master member and an unrecorded member in the absence of idealization produces a signal on the duplicate member which is badly distorted and is as much as 40 decibels weaker than the signal obtained in a duplicate member made with the use of idealization.

The frequency of the idealizing field is not critical in respect to the signal level of the duplicate member, although the frequency of the field has an effect on the speed with which the duplication is made. Frequencies from the highest obtainable to a few cycles per second may be used. It is not necessary that the idealizing field be sinusoidal. Thus a succession of permanent magnets or of D. C. electromagnets of gradually decreasing strength may be used in place of A. C. electromagnets. For example, frequencies of 60 cycles per second, 600 C. P. S., and supersonic frequencies up to 120,000 C. P. S. have been used successfully. Vibrations, including ultrasonic vibrations, may also be employed in place of electromagnetic idealizing means.

As previously set forth, it is preferred that the reproduction of the residual induction pattern of the master record member takes place while the magnetic elements of the two members are face to face, particularly when the sound pattern includes fairly high frequencies. We have found that the insertion of a non-magnetic backing layer, such as a thin strip of paper as is frequently used as the backing in magnetic record members, between two magnetic elements, has but little effect on the reproduction of low frequency patterns from one element to the other, but reduces considerably the reproduction of high frequency patterns. In respect to playback signal strength, we have likewise found that the reproduction of signal from a recorded tape to an unrecorded tape, when the magnetic surfaces are in contact, is not seriously affected by frequency, except in so far as demagnetization effects may alter residual induction in the duplicate record member for extremely short wave lengths. For example, signals of equal play-back strength at 400, 800 and 3200 cycles were obtained in the duplicate member, produced by face-to-face reproduction in the presence of a proper idealizing field from a master record made at recording speeds of about nine inches per second.

Thus by employing the proper idealizing field and face-to-face contact between the magnetic elements of the master and duplicate record members, it is possible to make duplicate record members of good quality which are linear and are substantially free from frequency distortion. We have found, if the duplicate print is made from tape record members of magnetic properties very similar to the magnetic properties of the master record member, that the dynamic range of the duplicate member is materially reduced. By employing a record member of relatively high signal strength for the master record and a record member of relatively lower signal strength for the duplicate member, a reproduced signal level may be obtained in the duplicate record member that is within two decibels or less of the maximum signal level which may be directly recorded on the record member with 1% third harmonic distortion by conventional recording methods. In addition the duplicate recorded member does not have the modulation noise frequently obtained in direct recording from conventional recording heads and supersonic bias fields, and thus the full dynamic range of the duplicate recorded member, obtainable with conventional recording practices may be secured, or in fact, exceeded.

The improved method of making multiple magnetic recordings thus comprises placing the master record in contact, magnetic surface to magnetic surface, with an unrecorded magnetic record member preferably of lower absolute values of signal and noise, applying an alternating magnetic field (or one of the equivalent media previously mentioned) to attain substantial idealization of the magnetic element of the duplicate member in the field of the master record member, and then gradually reducing the alternating magnetic field to zero, before separating the duplicate from the master member.

Figure 1:
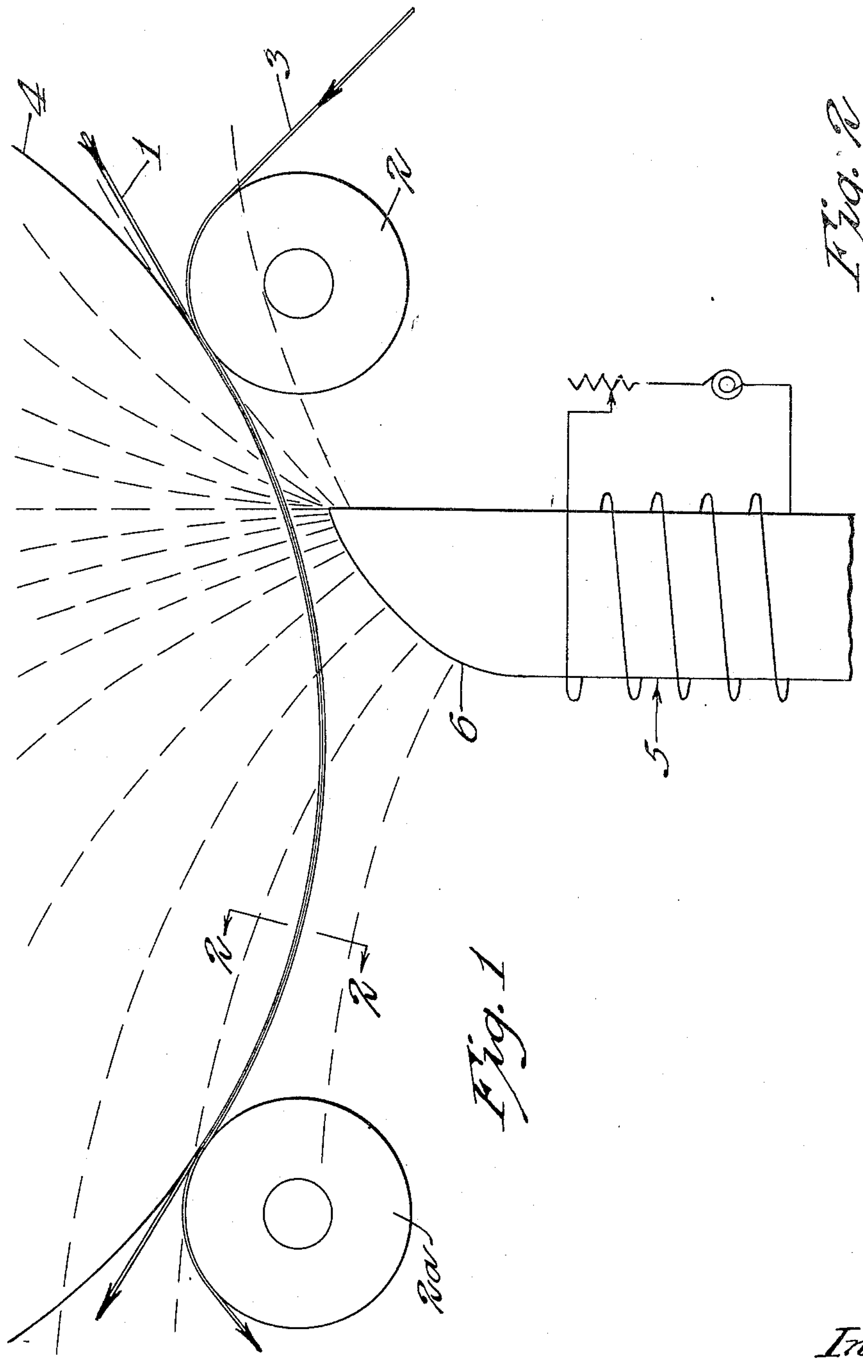
Fig. 1 is an enlarged, fragmentary, diagrammatic illustration of one type of duplicating apparatus within the invention.
Figure 2:
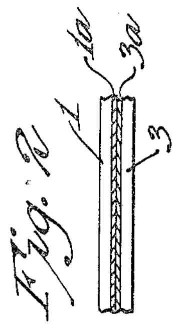
Fig. 2 is an enlarged, fragmentary view in cross-section of a master record member and an unrecorded member, with their magnetic surfaces in contact, taken along the line 2—2 of Fig. 1.

It is readily apparent from the foregoing that several forms of apparatus may be employed to reproduce the residual induction pattern of a master record member upon a duplicate or print member in the manner described. For example, as shown in Fig. 1, the master record in the form of a magnetically coated tape 1 may pass over a pair of pulleys 2 and 2a and an unrecorded tape 3, comprising the duplicate member, may be moved in face-to-face contact with the master record between the pulleys 2 and 2a and over a portion of the periphery of a rotatably mounted drum 4. As shown in Fig. 2, the magnetically coated surfaces 1a and 3a of the master record member 1 and the duplicate member 3, respectively, are in contact while travelling between the pulleys. An A. C. electromagnet 5 is disposed adjacent to the path of the two record members. As shown in Fig. 1, the pole piece 6 may have a tapered pole portion in order to intensify the magnetic flux concentration in an area near the beginning of the common track of the record members 1 and 3. Thus the idealizing field is substantially confined to the area in which the two record members are in contact. The gradual reduction of the idealizing field may be accomplished without varying the average field intensity by restricting the region where the field has its full strength to a portion of the distance in which the two members are in contact, e. g., the two record members move out of this region in contact and thus are subjected to gradually reducing alternating magnetic fields.

It is of prime importance that the master record member and the duplicate member move at the same speed while they are in contact. Duplicating speeds as high as mechanically practicable may be used, and it is not absolutely necessary that the speed be uniform as is the case in conventional recording practices. Likewise the speed of the master and duplicate record members is not related to the speed at which the master record or duplicate recordings are played in conventional reproducing devices.

While the record members are in magnetic face-to-magnetic face contact (as shown in Fig. 2), it is important that they be subjected to at least several cycles of the maximum value of the idealizing field, and immediately subsequently, to at least several, and preferably about 100, cycles at gradually decreasing values. When low frequency idealizing fields, such as 60 cycle fields, are employed, it is apparent that the record members must be moved slowly through the field or that the area of the idealizing field be relatively large and the path, during which the two record members are in contact, be relatively long. It is also apparent that an increase in the speed of the two record members during reproduction of the residual induction pattern of the master record may be obtained by employing a large area of idealization and also a lengthy path of contact of the two members, or by a higher frequency field, or by a combination of these factors. The speed of movement of the two record members may also be increased over those feasible at low frequencies, by the use of supersonic idealizing frequencies.

The idealizing field may be oriented transversely or longitudinally to the record members. It is important that the strength of the idealizing field should not be such as to reduce materially the residual induction of the master record member. Thus the field strength should be kept well below the coercive force of the master record member. In order to safeguard against the possibility of erasure of the master record member, it is desirable to position the tape record members so that the duplicate, unrecorded member is in an intense portion of the idealizing field while the master member is in a relatively less intense field, to the extent that some gradient in the field necessarily exists.

The improved method of duplicating magnetic recordings is particularly applicable to duplicating recordings on magnetic tape members and may also conveniently be used to obtain duplicate copies of magnetically recorded sheets, disks, rolls and cylinders, and to transfer not only speech and music or other audio frequencies, but also pulse recordings, such as may be used in mathematical computers and automatic sorting machines. The invention is particularly suitable for use with coated magnetic tape, as well as solid metal ribbons or sheets having the necessary magnetic properties for satisfactory recording and reproducing of sound. Stainless steel tapes are an example of suitable metal tapes that may be employed. Certain such tapes have a coercive force of approximately 245 oersteds. Coercive force is a measure of the ability of the magnetic element to retain its state of magnetization under the influence of demagnetizing fields, and it is a measure of the short wave length output of a record member.

Various magnetic particles have been used as the coating material in producing coated magnetic recording tapes. Tape record members, coated with magnetite powder, that have a coercive force of from 100 to 250 oersteds, have been used and may be successfully employed in our improved duplicating method, as the unrecorded tape member upon which the magnetic pattern of a master tape of higher coercive force is to be reproduced.

Highly satisfactory results have been obtained by employing as the master record member a coated record member having a paper, cellulose acetate or other film backing coated with black iron oxide particles produced by reducing acicular iron oxide under controlled conditions. This record member has a coercive force of from 290 to 360 oersteds and is usually in the neighborhood of 325 oersteds. It may be used with an unrecorded tape, upon which the magnetic pattern is to be reproduced, coated with a red, gamma ferric oxide of a coercive force of from 220–290 oersteds. Tapes coated with other gamma ferric oxides having a coercive force of approximately 110 oersteds are known to the art and also may be used as the duplicate record member, but are not as satisfactory record members in respect to output and frequency response as the record members coated with the gamma iron oxide of the higher coercive force.

Record members coated with magnetic particles comprising approximately 30% $Fe_2O_3$, 44% $Fe_3O_4$ and 26% $Co_2O_3$ have a coercive force of approximately 880 oersteds and may satisfactorily be used as the master record member in conjunction with a duplicate record member of lower coercive force, such as the record members coated with the black iron oxide of about 325 oersteds, in practicing our invention. Other magnetic tape record members, having a satisfactory output and frequency response may also be employed as the master record member or the duplicate member, with the understanding that to obtain the best results, the master record member should have a higher coercive force than the unrecorded duplicate member. To obtain the desired signal output, both the master and duplicate record members should have a fairly high remanence value, e. g. of at least approximately 500 gauss.

Thus the magnetic properties of the master record member should be such that it possesses high signal strength and is difficult to erase magnetically. The duplicate record member preferably has a low value of idealizing field and has a relatively high signal strength after idealization and also low noise. It is thus apparent that the relationship between the master record member and the duplicate record member, in respect to their magnetic properties, is preferably such that substantial idealization of the duplicate member may be obtained with substantially no erase of the magnetic pattern on the master record member.

The maximum idealization field is controlled by the magnetic properties of the master member. The field should be as large as possible without seriously erasing the magnetic pattern of the master record. Slight erasure of the master member, for example, erasure of from ½ decibel at low frequencies to from 1 to 3 decibels at high frequencies, may be permissible, since such minor erasure may be easily compensated in the recording of the master member. This slight amount of erasure, while not desirable, occurs only the first time the master record is subjected to the idealizing field and further erasure does not occur during the production of subsequent duplicate members.

It is to be understood that it is not necessary that the master record member be placed in the magnetic idealizing field. Since the simplest and most practical apparatus embodies placing the master record in contact with the duplicate member, it is impossible to avoid subjecting the master record to some idealizing field in such apparatus.

In employing, as the master record member, magnetic recording tape coated with the black iron oxide particles having a coercive force of from 290 to 360 oersteds previously described, satisfactory duplicate recordings have been obtained using a maximum idealizing field of approximately 200 to 250 oersteds. An idealizing field of approximately 400 oersteds may be employed with a master record member comprising magnetic tape coated with magnetic particles of approximately 30% $Fe_2O_3$, 44% $Fe_3O_4$ and 26% $Co_2O_3$ of a coercive force of approximately 880 oersteds.

Weaker idealizing fields should be employed with master record members that are more easily erased than the two record members mentioned. In general the idealizing field should be greater than the coercive force of the duplicate record member and preferably of about the saturating value of the duplicate member. It should be as large as possible without substantially erasing the master record. If the idealizing field is too small, the duplicate record member will be low in intensity and nonlinear in amplitude.

Apparatus suitable for practicing our improved duplicating method is illustrated in the drawings. Modifications of such apparatus within the scope of this invention will be apparent from the drawings and this description.

Referring to the apparatus shown schematically in Fig. 4, the reference character 7 indicates a frame structure supporting a plurality of electromagnets 8 in spaced relation. Conductors 9 and 10 connect the electromagnets 8 in series and lead to a source of alternating electric current. A pulley 11 is rotatably mounted within the field of each electromagnet. The master tape record member 12 is supplied continuously from the master supply reel 13 and is driven consecutively around drive pulley members 14 and pulleys 11 to the master take-up reel 15. The pulleys 14 and 11 are so driven that their peripheral velocities are the same. The take-up reel 15 may be driven by a variable speed, constant torque motor or clutch (not shown).

The unrecorded tape record members 16 are drawn from supply reels 17. The length of the unrecorded tape strip 16 preferably approximates the length of the recorded master member 12. As shown in Fig. 4 a separate unrecorded tape strip 16 is provided for each electromagnet 8 and pulley 11. Thus a great number of duplicate recordings may be made simultaneously. The unrecorded tape members 16 are drawn from the supply reel with their magnetically active surface disposed outwardly, and then pass over the driven pulley member 18 and over the upper half of pulley 11 through the field of electromagnet 8 to the take-up reels 19. The members 18 are driven at the same peripheral speed as the pulleys 11 and accordingly there is no relative slippage between the master record member 12 and the unrecorded members 16 as they go through the idealizing field adjacent the pulley 11. As previously mentioned a plurality of direct current magnets, permanent magnets of decreasing strength or other idealizing media may be employed in place of electromagnets 8, but the latter are preferred because of their convenience. The master record member 12 is wound upon its supply reel 13 with its magnetically active surface facing inwardly and thus as the master record member 12 and the unrecorded tape member 16 are drawn about pulleys 11 and through the fields of electromagnets 8, the magnetically active surfaces of the two record members are in contact. As shown, the record members 16 are wound upon the take-up reels 19 with their magnetically active surfaces inwardly. If desired, the direction of rotation of the take-up reels 19 may be reversed so that the active surfaces of the record members 16 are disposed outwardly. It will be seen that in the apparatus of Fig. 4 the master tape member 12 may be run in either direction past the electromagnets 8, or the record member 12 may be run alternately in both directions.

Figures 5, 6:
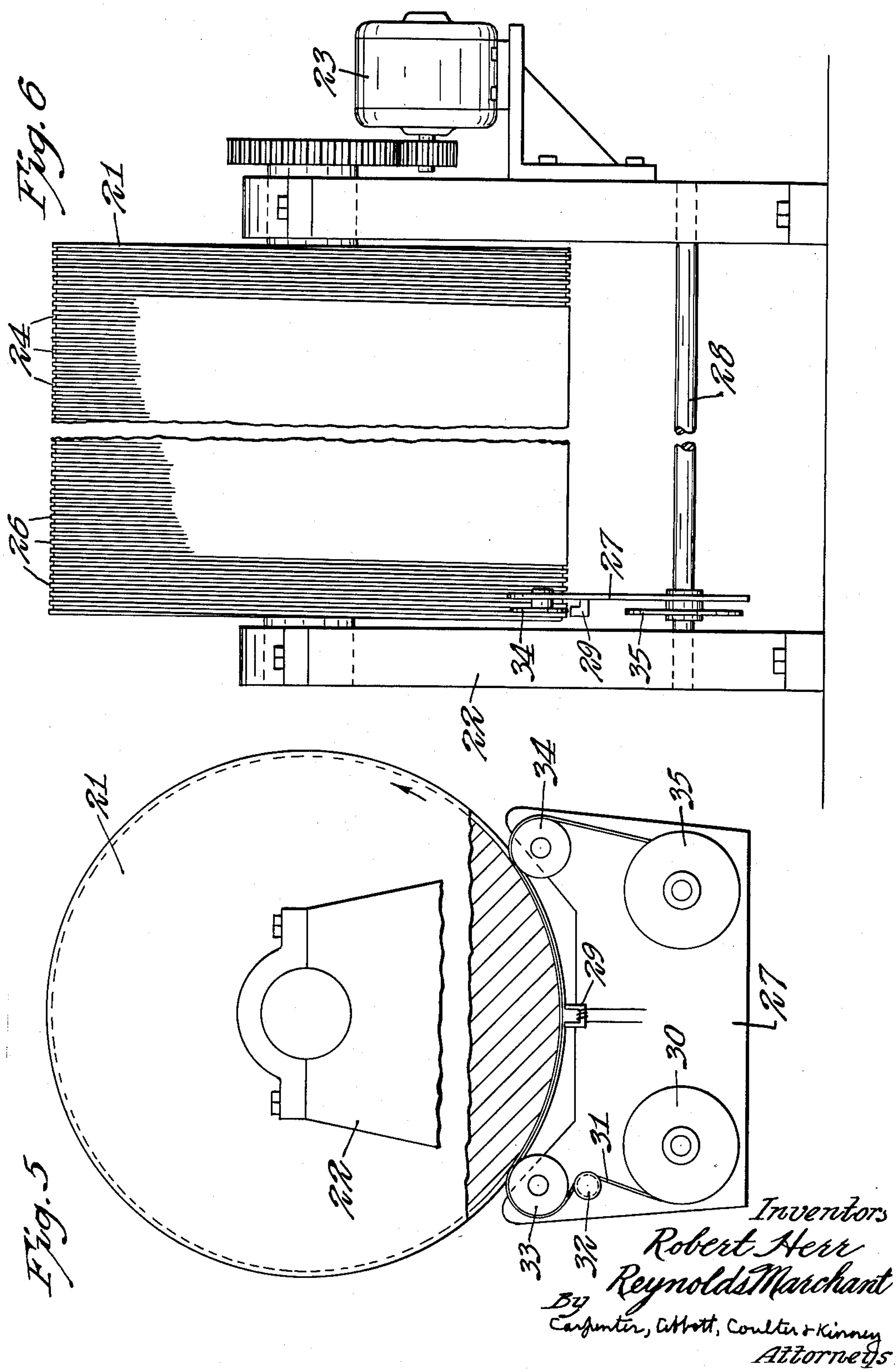
Fig. 5 is a broken end elevation of a further type of duplicating apparatus.
Fig. 6 is a broken side elevation of the apparatus shown in Fig. 5.

Referring to the apparatus shown in Figs. 5–7, the references character 21 indicates a drum rotatably mounted in standards 22 and driven by the motor 23. The periphery of the drum, as shown in Figs. 6 and 7, is provided with a spiral groove 24 extending substantially the length of the drum. The master record member 25 is disposed in the groove 24 with its magnetically active surface facing outwardly. For tape members of the conventional dimensions, the groove 24 may be one-quarter inch in width and the lands 26 between the grooves may be of like width. The drum may be of any convenient size dependent on the length of the master record member; for example, a drum 66 inches long and 36 inches in diameter is suitable for many usages.

A tape supporting carriage 27 is mounted on shaft 28 supported in the standards 22 and the carriage is keyed to the shaft so as to move transversely along the periphery of the drum, as the drum is rotated, in the manner of a non-rotating nut moving along a turning screw.

An electromagnet 29, energized from a source of alternating electric current (not shown), is mounted upon the carriage 27 adjacent to the periphery of the drum 21. The carriage also supports a supply reel 30 of unrecorded tape 31, a driven pulley 32, tape guide and keying pulleys 33 and 34 and a take-up reel 35. The pulleys 33 and 34 are disposed on opposite sides of the electromagnet 29 adjacent to the periphery of the drum and outside of the field of the magnet.

The unrecorded tape member 31 is drawn from the reel 30 with its magnetically active surface facing outwardly over pulleys 32 and 33 and into the spiral groove 24 where its magnetically active surface is in contact with the active surface of the master record member 25, as both members are moved through the idealizing field of the electromagnet 29. The duplicate record mmeber 31 then passes over the pulleys 34, is withdrawn from the groove 24, and is rewound on the take-up reel 35. The drums 33 and 34 move the record member 31 at the peripheral speed of the drum 21, so that both record members 25 and 31 are moved at the same speed while in contact and without slipping. As the drum 21 revolves, the carriage 27 is moved transversely across the periphery of the drum in order that the entire length of the record member 31 may be successively brought into contact with the master record member 25.

It is to be understood that a plurality of tape handling carriages 27 may be disposed either axially or circumferentially about the periphery of the drum in order that several duplicate record members may be made during the same operation of the drum.

Since the master record is not wound and rewound or passed over pulleys under tension, the type of apparatus shown in Figs. 5–7 is advantageous in extending the useful life of, and in increasing the number of prints which may be made from, a single master record member. Furthermore the duplicating process is continuous and there is no idle time for rewinding the master record member.

Highly satisfactory duplicate records may be produced in the apparatus shown when the master and unrecorded members are driven at 10 inches per second and the idealizing field changes at 600 cycles per second. In the example referred to, the master record member had a coercive force of about 325 oersteds and the maximum field in the path of the record member was about 300 oersteds. Following the path of the record members the field drops to about one-tenth of its maximum strength in one inch, which is about one-tenth of a second or 60 cycles of field. In another 60 cycles the field is down to 2 or 3% of its maximum strength. If the decrease in field is too rapid, an undesired note may be recorded on the record members.

The speed at which the record members may be moved through the field is controlled by the number of cycles of idealizing field it will be subjected to in passing from the region of maximum strength to zero. The speed of the members may be increased by increasing the length of the path of the members within the idealizing field, i. e. increasing the size of the electromagnet. The relation between speed of the record members and frequency should be strictly linear. In general with a larger magnet, the paths of the record members need not be as close to the magnet, and the field will not vary as sharply along the path of the members, as when a smaller magnet is used. In the apparatus illustrated the idealizing field is partly through and partly longitudinal to the record members. Orientation of the field has not been found ot be critical in our duplicating method. An idealizing field of ultrasonic frequencies may be obtained with magnets of the same principle.

We claim:

1. The method of copying a magnetic pattern from a master magnetic record member comprising placing said master record member in close proximity with a copy magnetic record member in a magnetic field of sufficient strength to cause magnetization of the copy record member corresponding to the magnetic pattern on the master record member.

2. The method of copying on unrecorded magnetic record members the pattern magnetically recorded on a master record comprising maintaining the magnetically active surfaces of said unrecorded member and said master record in juxtaposition and moving said members through a gradually diminishing idealizing field in said position.

3. The method of duplicating the magnetic recording on a master tape record member comprising bringing the magnetic surface of said master record member into juxtaposition with the magnetic surface of an unrecorded tape record member in the presence of a magnetic idealizing field and gradually reducing the field value to approximately zero before separating said record members.

4. The method of copying on unrecorded magnetic record members a pattern magnetically recorded on a master record member comprising successively bringing the magnetically active surfaces of said unrecorded record member and of said master record member into juxtaposition and moving them through an alternating magnetic field without changing the position of said members relative to each other while in said field.

5. The method of copying on unrecorded magnetic record members a pattern magnetically recorded on a master record member comprising successively bringing the magnetically active surfaces of said unrecorded record member and of said master record member into juxtaposition and moving them through a field of direct current magnets of decreasing strength without changing the position of said members relative to each other while in said field.

6. The method of copying on unrecorded magnetic record members a pattern magnetically recorded on a master record member comprising successively bringing the magnetically active surfaces of said unrecorded record member and of said master record member into juxtaposition and moving them through a field of permanent magnets of gradually decreasing strength without changing the position of said members relative to each other while in said field.

7. The method of copying on unrecorded magnetic tape members the track magnetically recorded on a master tape member comprising successively bringing the magnetically active surfaces of said unrecorded tape members and of said master tape member into juxtaposition and moving said members through an alternating magnetic field of gradually diminishing values without changing the position of said tape members relative to each other while in said field, the maximum value of said field being just below the value that will substantially erase the residual magnetization of said master tape member.

8. The method of duplicating the magnetic track of a master tape record member comprising placing the magnetic surface of said master record member adjacent to the magnetic surface of an unrecorded tape member in the presence of an alternating magnetic field of sufficient magnitude to effect substantial magnetization of the unrecorded tape member in the field of the master tape member without substantially erasing the magnetic track on the master tape member, and then gradually reducing the alternating field to zero value before separating the two tape members.

9. The method of copying on unrecorded magnetic record members a pattern magnetically recorded on a master record member comprising bringing the magnetically active surface of said unrecorded member into juxtaposition to the magnetically active surface of said master record member and moving said members through an alternating magnetic field of diminishing strength without changing the relative position of said members while in said field, the coercive force of said master record member being greater than the coercive force of said unrecorded member.

10. The method of duplicating the magnetic sound record on a master tape member comprising placing the magnetic surface of said master tape member in contact with the magnetic surface of an unrecorded tape record member of lower coercive force than the first mentioned member and moving said members through an idealizing field of diminishing values before separating said members.

11. The method of copying a magnetic track from an elongated master record member comprising successively bringing the magnetically active surface of a master record member having a coercive force between 290 and 360 oersteds into juxtaposition with the magnetically active surface of an unrecorded record member having a coercive force of from 220 to 290 oersteds and moving said members through an alternating magnetic field without changing the position of said members relative to each other while in said field, said field having a maximum value in the paths of said master record member below the coercive force of said master record member.

12. Apparatus for making duplicate magnetic recordings from a master tape record member comprising a pair of spaced rotatable reels from one to the other of which a master record member may travel, a second pair of rotatable reels from one to the other of which an unrecorded tape record member may travel, means for bringing successive portions of said members into juxtaposition during their travel between said reels, a source of oscillations adapted to provide an idealizing field substantially confined to the path of said unrecorded tape member while in juxtaposition to said master tape record member, and means for driving said record members from one reel to the other at the same speed.

13. Apparatus as specified in claim 12 in which the source of oscillations comprises an alternating current electromagnet and an electrical circuit to energize said electromagnet.

14. Apparatus as specified in claim 12 in which the source of oscillations comprises a plurality of permanent magnets of decreasing strength.

15. Apparatus as specified in claim 12 in which the source of oscillations comprises an electrostatic field.

16. Apparatus for making copies of the magnetic track on a master tape record member comprising a pair of spaced rotatable reels, a master tape record member on said reels, a plurality of pairs of rotatable reels, an unrecorded tape record member on each pair of said reels, guides for bringing each of said unrecorded tape record members into juxtaposition with the magnetically active surface of said master record member during their travel between said reels, means for driving said unrecorded tape record members and said master record member at the same speed while in juxtaposition, an electromagnet disposed adjacent to the portion of each guide over which said master record member and unrecorded record member travel and an electrical current to energize said electro-magnet.

17. Apparatus for making duplicate record members from a master tape record member, comprising a rotatable drum, an elongated master record member mounted on the periphery of said drum with its magnetically active surface disposed outwardly, a carriage adapted to travel axially to the drum as the drum rotates, two reels mounted on said carriage in spaced relation, an unrecorded tape member on said reels, guide means between said rotatable reels for bringing the magnetically active surface of said unrecorded tape member into contact with the magnetically active surface of said master record member, means for spooling said unrecorded tape member from one reel to the other at the exact speed of the periphery of said drum, and a source of oscillations adapted to provide an idealizing field substantially confined to the area of contact of said master record member and said unrecorded tape member.

18. Apparatus for making duplicate record members from a master tape record member comprising a rotatable drum, a spiral groove on the periphery of said drum, means for driving said drum, a master tape record member disposed in said groove with its magnetically active surface facing outwardly, a carriage adapted to move axially to said drum adjacent to its periphery, a pair of spaced rotatable reels mounted on said carriage from one to the other of which an unrecorded record member may travel, means for bringing successive portions of said unrecorded record member into contact with successive portions of said master record member, means for moving said unrecorded record member at the peripheral speed of the drum, and an electromagnet and an electrical circuit adapted to provide an alternating magnetic field substantially confined to the area of contact of said master record member and said unrecorded record member.

19. Apparatus for making duplicate magnetic record members from a master tape record member comprising a master tape record member, means for moving said master tape member in a fixed path, a pair of spaced apart reels, an unrecorded record member on said reels, guide means for bringing successive portions of said unrecorded record member into juxtaposition to the magnetically active surface of successive portions of said master tape record member during the travel of said unrecorded members between reels, means for moving said unrecorded record member at the speed of the master record member while the two members are in juxtaposition, and a source of oscillations adapted to provide an idealizing field substantially confined to the area in which said record members are in juxtaposition.

20. Apparatus for duplicating on an unrecorded record member the track magnetically recorded on a master record member comprising a master record member having a magnetic coating on one surface and a track magnetically recorded thereon, an unrecorded record member having a magnetic coating on one surface, guide members for bringing successive portions of the magnetic coatings of each member into contact, means for moving said members at the same speed while said members are in contact, and a source of oscillations adapted to provide an idealizing field in the area of contact of said members.

21. The method of duplicating the magnetic recording on a master record member comprising bringing the magnetic surface of said master record member into juxtaposition with the magnetic surface of an unrecorded record member in the presence of a magnetic field and gradually reducing the field value to approximately zero before separating said record members.

22. In a method of duplicating magnetic records, the steps of translating a selected intelligence into a signal flux configuration on the surface of a magnetic record, placing said record in intimate contact with a ferromagnetic copy medium, and subjecting said record and said medium to a uniform A—C magnetic transfer field, said magnetic transfer field having a field strength less than the coercive force of said record and more than the coercive force of said copy medium.

23. The method defined in claim 22 in which the copy medium has a coercive force at least 100 oersteds less than the coercive force of said record.

24. The method of copying a magnetic track from an elongated master record member comprising successively bringing the magnetically active surface of a master record member having a coercive force of the order of 880 oersteds into juxtaposition with the magnetically active surface of an unrecorded record member having a coercive force within the range of from 290 to 360 oersteds and moving said members through an alternating magnetic field without changing the position of said members relative to each other while in said field, said field having a maximum value in the pattern of said master record member below the coercive force of said master record member.

25. An apparatus for transferring a magnetic pattern from a master record medium to a magnetizable copy medium which comprises a master magnetic record medium, a magnetizable copy record medium, elements producing a magnetic field, and means for bringing the magnetic surface of said master record medium into juxtaposition with the magnetic surface of said magnetizable copy record medium in said field.

26. The method of duplicating a magnetic pattern from a master magnetic medium to a magnetizable copy medium including the steps of establishing a magnetic duplicating field of an intensity less than the coercive force of the master medium and greater than the coercive force of the copy medium, and placing the master medium in contact with said copy medium within said duplicating field.

27. An apparatus for transferring a magnetic pattern from a master magnetic medium to a magnetizable copy medium which comprises a master magnetic medium, a magnetizable copy medium, excitation elements for producing a magnetic transfer field, said excitation elements being disposed to provide a field at an angle to the direction of magnetization of said master record medium, and means urging said media together into close contact with each other in said transfer field.

28. An apparatus for transferring a magnetic pattern from a master magnetic medium to a magnetizable copy medium which comprises a master magnetic medium, a magnetizable copy medium, excitation elements for producing a magnetic transfer field, said excitation elements being disposed to provide a field perpendicular to the plane of the direction of magnetization of said master record medium, and means urging said media together into close contact with each other in said transfer field.

References Cited in the file of this patent

UNITED STATES PATENTS

| | | |
|---|---|---|
| 1,774,821 | Baruch | Sept. 2, 1930 |
| 1,828,189 | Kiliani | Oct. 20, 1931 |
| 1,828,190 | Kiliani | Oct. 20, 1931 |
| 1,960,094 | Thurm | May 22, 1934 |
| 2,073,412 | Capelli | Mar. 9, 1937 |
| 2,080,100 | Tauschek | May 11, 1937 |
| 2,327,956 | Begun | Aug. 24, 1943 |

FOREIGN PATENTS

| | | |
|---|---|---|
| 880,559 | France | Mar. 30, 1943 |

OTHER REFERENCES

S. M. P. E. Journal, Jan. 1949, pp. 77–88.